United States Patent [19]

Lin et al.

[11] Patent Number: 5,765,026
[45] Date of Patent: Jun. 9, 1998

[54] METHOD FOR IMPLEMENTING STATE MACHINE USING LINK LISTS BY DIVIDING EACH ONE OF THE COMBINATIONS INTO AN INITIAL SECTION, AN IMMEDIATE SECTION, AND A FINAL SECTION

[75] Inventors: Zhongru Julia Lin; Nadeem Malik, both of Austin, Tex.; Chandrasekhar Narayanaswami, Valhalla, N.Y.; Avijit Saha; Brett Adam St. Onge, both of Austin, Tex.

[73] Assignee: International Business Machines Corporation, Armonk, N.Y.

[21] Appl. No.: 491,460

[22] Filed: Jun. 16, 1995

[51] Int. Cl.$^6$ ................................................ G06F 13/00
[52] U.S. Cl. ..................... 395/850; 395/416; 395/500; 395/561; 395/595; 326/46; 326/10; 326/38
[58] Field of Search ....................... 348/705; 375/365; 379/266; 395/183.04, 406, 421.1, 757, 416, 500, 561, 595, 850, 611; 364/551.01; 326/10, 38, 46

[56] References Cited

U.S. PATENT DOCUMENTS

| | | | |
|---|---|---|---|
| 4,674,089 | 6/1987 | Poret et al. | 395/183.04 |
| 4,775,956 | 10/1988 | Kaji et al. | 395/757 |
| 4,984,192 | 1/1991 | Flynn | 395/800 |
| 5,025,458 | 6/1991 | Casper et al. | 375/365 |
| 5,036,473 | 7/1991 | Butts et al. | 364/489 |
| 5,157,495 | 10/1992 | Small | 348/705 |
| 5,259,063 | 11/1993 | Salazar | 395/3 |
| 5,280,595 | 1/1994 | Lemay et al. | 395/421.1 |
| 5,386,518 | 1/1995 | Reagle et al. | 395/310 |
| 5,392,415 | 2/1995 | Badovinatz et al. | 395/406 |
| 5,515,428 | 5/1996 | Sestak et al. | 379/266 |
| 5,528,516 | 6/1996 | Yemini et al. | 364/551.01 |
| 5,551,026 | 8/1996 | Kaplan et al. | 395/611 |

OTHER PUBLICATIONS

"Computer Communications Automatic Protocol Conformance Generation of Test Cases", IBM TDB, n3, pp. 28–32, Aug. 1991.

"Reduction of Link List Searching Time by using Sort and Searched Pointers", IBM TDB, n2, pp. 337–340, Jul. 1992.

*Primary Examiner*—Thomas C. Lee
*Assistant Examiner*—Po C. Huang
*Attorney, Agent, or Firm*—Richard A. Henkler

[57] ABSTRACT

An improved method and system for creating state machines in microcode. State machines are typically defined by a plurality having at least a combinations of current state, next state. Each one of the current states and next states are typically assigned unique values to distinguish them from other current states and next states, respectively. Upon an examination of the binary bit representations for the combinations, certain repetitive patterns become apparent between certain sections of the combinations. These recognized repetitive bit patterns are grouped and represented by linked lists and associated with one another to form the necessary relationship to define the represented combinations. Thus, saving memory and/or storage resources.

8 Claims, 5 Drawing Sheets

|   | PRESENT STATE 102 | INPUT 104 | NEXT STATE 106 | OUTPUT 108 |
|---|---|---|---|---|
| 110 | 1011 | 0110 | 1111 | 1000 | 1 |
| 112 | 1011 | 0110 | 1111 | 1000 | 0 |
| 116 | 1011 | 0110 | 1110 | 1001 | 1 |
| 118 | 1011 | 0110 | 1110 | 1001 | 0 |
| 120 | 1011 | 0110 | 1110 | 1000 | 0 |

100

METHOD FOR IMPLEMENTING STATE MACHINE USING LINK LISTS BY DIVIDING EACH ONE OF THE COMBINATIONS INTO AN INITIAL SECTION, AN IMMEDIATE SECTION, AND A FINAL SECTION

BACKGROUND

1. Field of the Present Invention

The present invention generally relates to state machines, and more specifically to methods and systems for implementing state machines in microcode.

2. History of Related Art

In today's computerized industry, state machines are relatively common for design and implementation of various services and/or resources. The implementation of these state machines has typically taken the form of either microcode or random logic. State machines, which are implemented in microcode (microcode SMs), have several advantages over those implemented with random logic. One such advantage is the ability of microcode state machines to be modified in the field as opposed to random logic state machines which cannot.

Microcode SMs, however, also have several disadvantages when compared to random logic SMs, such as speed degradation and increased storage requirements. Improvements in these areas are greatly desired and valuable.

Therefore, it would be a distinct advantage to have a method and system for improving the speed and/or reducing the storage requirements for the implementation of state machines using microcode. The present invention provides such a method and system.

SUMMARY OF THE PRESENT INVENTION

The present invention is a method and system for creating state machines in microcode.

In one aspect, the present invention is a method of implementing a state machine in microcode. The state machine being defined by a plurality of combinations having a current state, a next state, an input, and an output. The method includes the step of creating a plurality of linked lists, each one of the plurality of linked lists storing a single selected portion of the plurality of combinations. The method further includes the step of interrelating each one of the plurality of linked lists one to another so as to form the plurality of combinations.

In yet another aspect, the present invention is a method of executing a state machine implementing in microcode. The state machine being defined by a plurality of combinations having a current state, a next state, an input, and an output. The method includes the step of retrieving, for each one of the combinations, a single selected portion of the combination form a linked list. The method further includes the step of executing the retrieved portions.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

Figure 1:
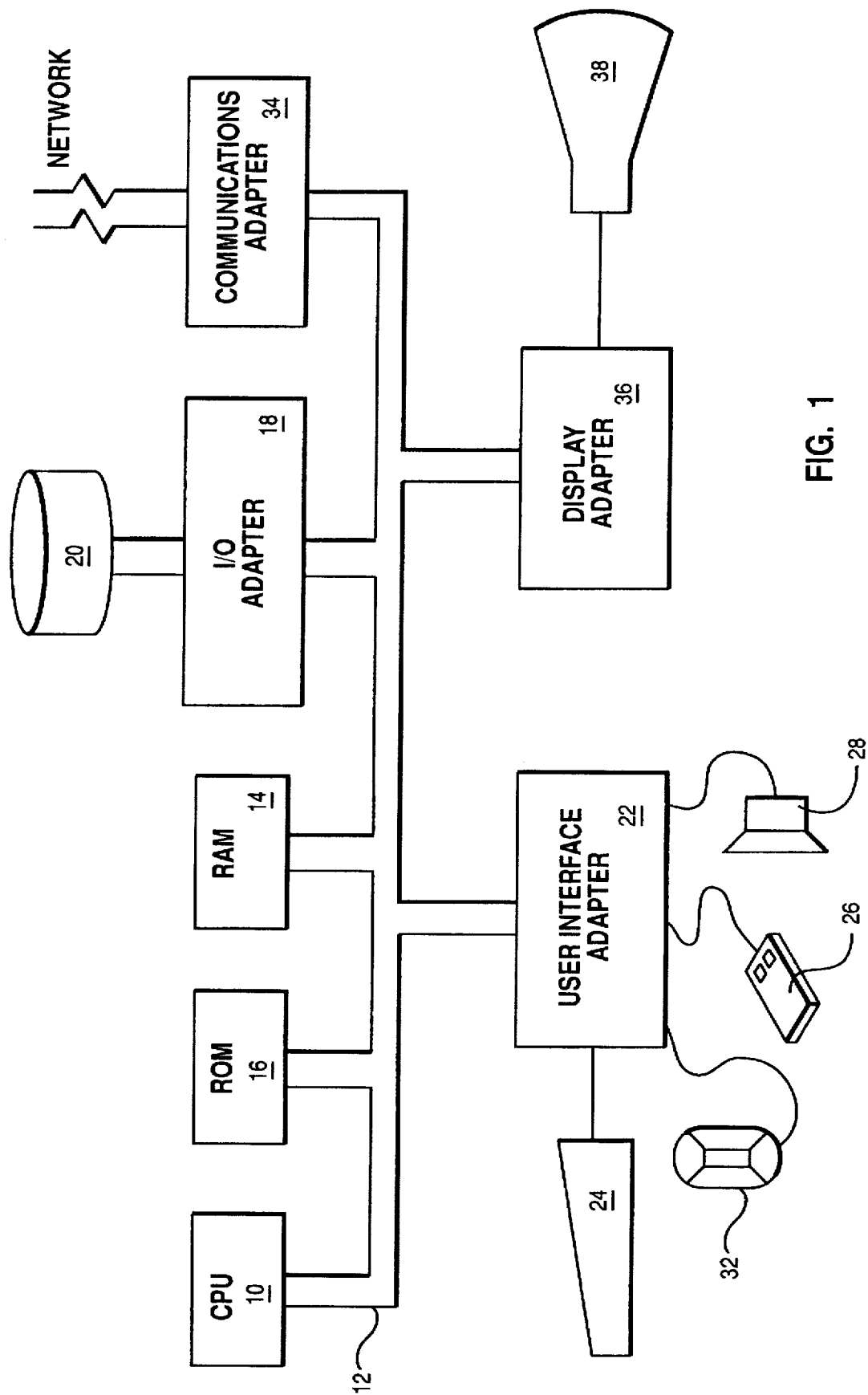
FIG. 1 is a block diagram of a typical data processing system which can be used in conjunction with the present invention.

Reference now being made to FIG. 1, a typical data processing system is shown which can be used in conjunction with the present invention. A central processing unit (CPU) is provided and interconnected to the various other components by system bus 12. Read Only Memory (ROM) 16 is connected to CPU 10 via bus 12 and includes the basic Input Output system (BIOS) that controls the basic computer functions. Random access memory (RAM) 14, I/O adapter 18 and communications adapter 34 are also interconnected to system bus 12.

I/O adapter 18 may be a Small Computer System Interface (SCSI) adapter that communicate with a disk storage device 20. Communications adapter 34 interconnects bus 12 with an outside network enabling the data processing system to communicate with other such systems. Input/Output devices are also connected to system bus 12 via user interface adapter 22 and display adapter 36. Keyboard 24, track ball 32, mouse 26 and speaker 28 are all interconnected to bus 12 via user interface adapter 22. Display monitor 38 is connected to system bus 12 by display adapter 36. In this manner, a user is capable of inputting to the system through the keyboard 24, track ball 32 or mouse 26 and receiving output from the system via speaker 28 and display 38. Additionally, an operating system such as DOS or the OS/2 system (OS/2 is a Trademark of IBM corporation) is used to coordinate the functions of the various components shown in FIG. 1.

Many design implementations of complex electronics and/or computers often begin with the defining of a State Machine (SM) to indicate desired responses to known variables. This typically results in defining all states, inputs (events), and desired outputs for the SM into corresponding combinations. The representation of the defined SM can take various forms, such as a table. It is common practice, however, to exclude selected combinations from the representation which never occur or which are insignificant.

Figures 2, 5:
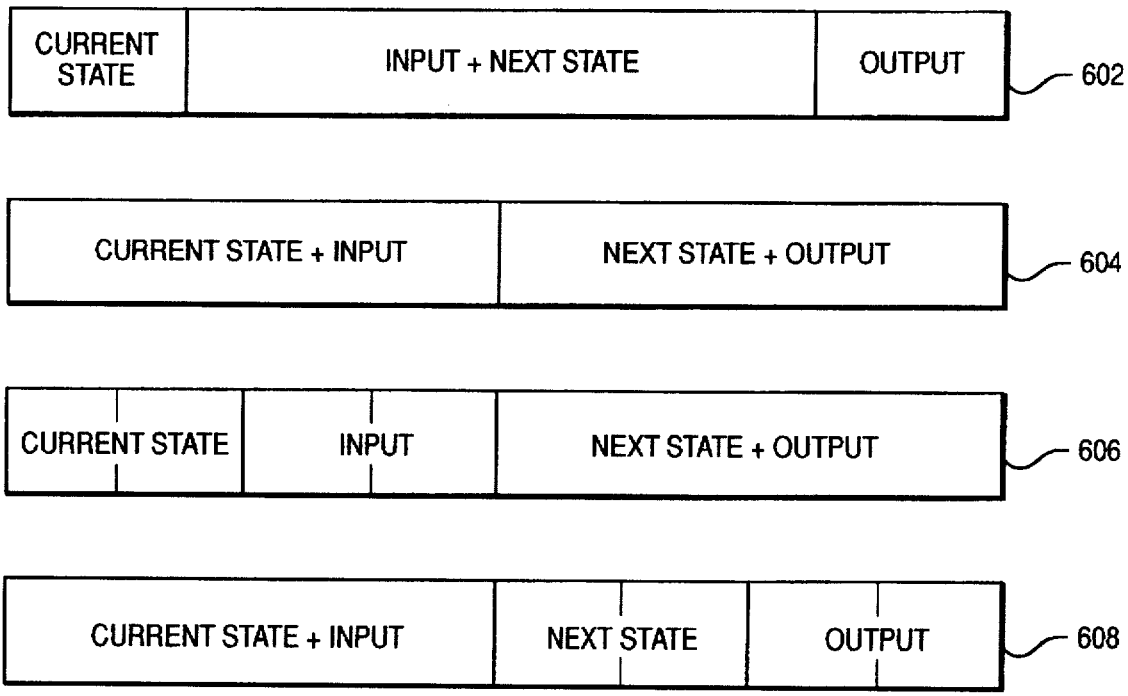
FIG. 2 is an example of a table illustrating the representation of a state machine in a typical microcode format.
FIG. 5 illustrates a plurality of block diagrams for showing a plurality of alternative embodiments for the present invention.

Reference now being made to FIG. 2, an example of a table 100 is shown illustrating the representation of a state machine in a typical microcode format. The table represents all defined present states 102, inputs 104, next states 106, and outputs 108 for the represented state machine. In this example, it is assumed that all present states 102 can be defined by a value which is 8 bits in length, all inputs and next states can be defined by values which are 8 bits in length, and all outputs can be defined by a single bit. Five entries in table 100 have been designated as 110–120.

respectively. The amount of memory and/or storage resources used for storing entries 110–120 is calculated by multiplying the 17 bits for each entry by the total number of entries. In this case the total memory and/or storage resources used is 850 bits.

As illustrated by FIG. 2 the present implementation of state machines using microcode results in the utilization of large amounts of memory and/or storage resources. Upon examination of such a SM microcode table, it is observed that certain combinations of states and/or inputs and/or outputs often re-occur. The present invention implements a method and system which capitalizes upon this observation to conserve memory and/or storage resources.

Figure 3:
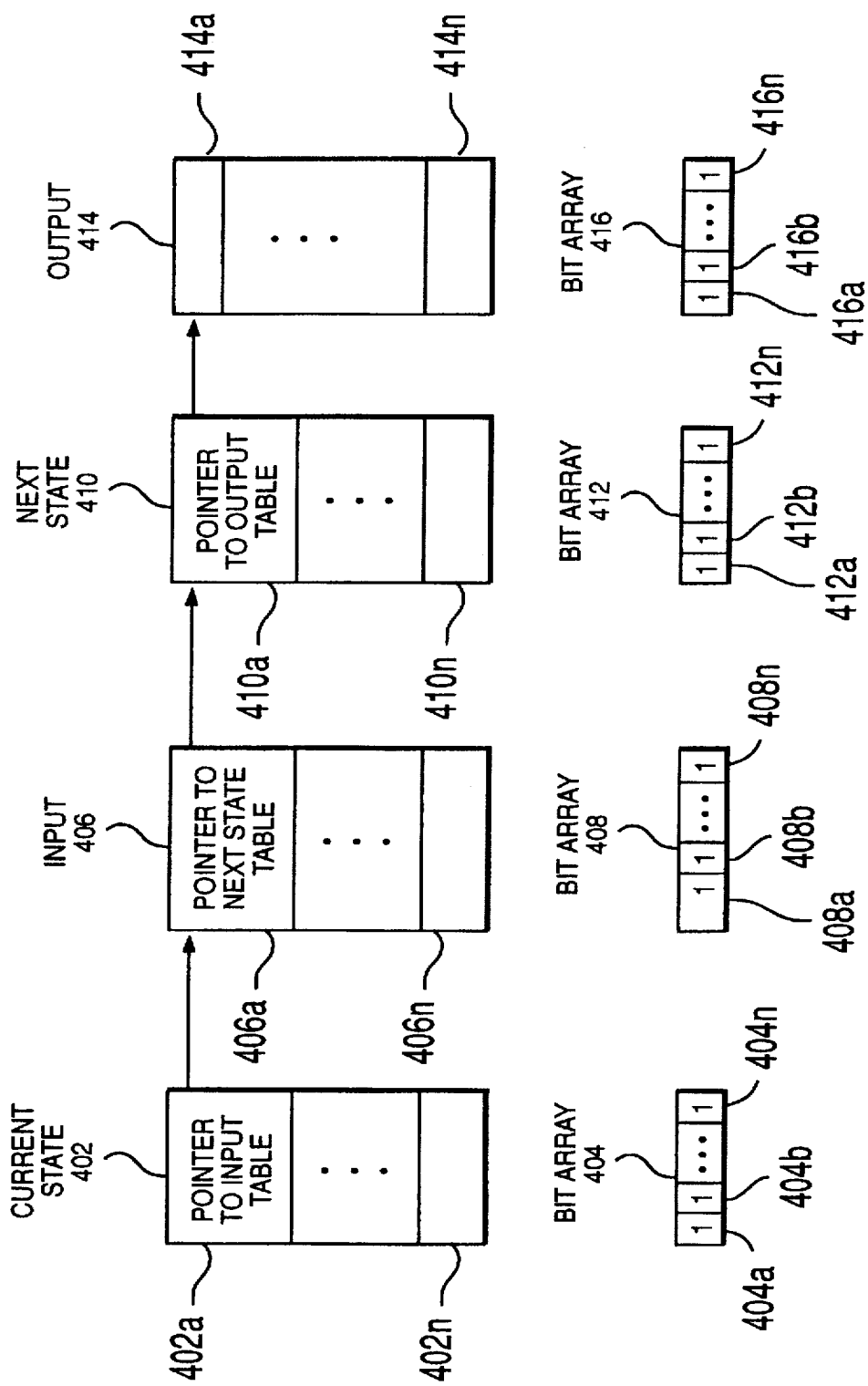
FIG. 3 is a block diagram illustrating an example of an implementation of a state machine in microcode according to the teachings of the present invention.

Reference now being made to FIG. 3, a block diagram is shown illustrating an example of an implementation of a state machine in microcode according to the teachings of the present invention. As previously discussed, all the relevant states, inputs, and outputs for the state machine are defined into corresponding combinations, such as those illustrated in FIG. 2.

In the preferred embodiment of the present invention, repetition of bit patterns for the combinations of the state machine are recognized, and these bit patterns are organized into groups. The groups are represented by link lists and associated with one another so as to form the desired relationship of the combinations.

In this example, it will be assumed that the repetition of bit patterns occur in the current states, inputs, next states, and outputs of the SM. Accordingly, each of the defined current states, inputs, next states, and outputs are stored in a current state 402, an input 406, a next state 410, and an output 414, linked list, respectively. The relative size for each of the above noted linked lists 402, 406, 410, and 414 is dependent upon the number of bits or maximum value used to describe the current state, input, next state, and output, respectively.

As each entry within the linked lists 402, 406, 410, and 414 is allocated it is assigned a value corresponding to one of the current states, inputs, next states, or outputs, respectively. Each one of the entries themselves, however, are pointers to another one of the linked lists 402, 406, 410, or 414. The use of pointers in lieu of values saves significant use of memory and/or storage resources. In addition, each of the linked lists 402, 406, 410, and 414 have an associated binary bit array 404, 408, 412, and 416, respectively, for determining their total size.

As is shown in FIG. 3, the current state linked list 402 comprises members 402a–402n which correspond to all relevant current states for the implemented SM. Members 402a–402n are arranged in a descending or ascending order within the linked list 402 that corresponds to the value assigned to the current state represented by them. Each one of the members 402a–402n contains a pointer to an individual input linked list which is organized in the same manner as input linked list 406 and includes a binary bit array which is used in the same manner as binary bit array 408. In addition, current state linked list 402 has a binary bit array 404 associated with it for indicating the total size of the current state linked list 402.

The binary bit array 404 has a total length which is equal to the maximum value that can be assigned to a current state in the SM. In other words, each one of the bits 404a–404n represents a corresponding member 402a–402n. Each bit 404a–404n within the bit array 404 is used to determine whether a position within the current state linked list 402 corresponding to the position of the bit 404a–404n in the bit array 404 is in use. If a bit 404a–404n is set, then the corresponding position within then current state linked list 402 is occupied. If, however, the bit 404a–404n is not set, then the corresponding position within the current state linked list 402 is vacant or not allocated. This has the additional advantage of being able to sum up the total number of bits 404a–404n which are set to instantly determine to total length of the current state linked list 402. As shown in FIG. 3, bit array 404 has bit positions 404a–402n set equal to one which corresponds to the fact that current state members 402a–402n are in use.

Input linked list 406 comprises members 406a–406nwhich represent all combinations of defined inputs for the SM which are related to the single one of the associated current state members 402a–402n that points to this input linked list 406. Members 406a–406n are arranged in a descending or ascending order within input linked list 406 that corresponds to the value assigned to the input represented by them. Each one of the members 406a–406n contains a pointer to an individual next state linked list which is organized in the same manner as next state linked list 410, and includes a binary bit array which is used in the same manner as binary bit array 412. Input linked list 402 also has a binary bit array 408 associated with it for indicating the total size of the linked list 406. Binary bit array 408 is organized in the same fashion as binary bit array 404, and therefore, further discussion is deemed unnecessary.

Next state linked list 410 comprises members 410a–410n which represent all combinations of defined next states for the SM which are related to the single one of associated input members 406a–406n that points to this next state linked list 410. Members 410a–410n are arranged in a descending or ascending order within next state linked list 410 that corresponds to the value assigned to the next state represented by them. Each one of the members 410a–410n contains a pointer to an individual output linked list which is organized in the same manner as output linked list 414, and includes a binary bit array which is used in the same manner as binary bit array 416. Next state linked list 410 also has a binary bit array 412 associated with it for indicating the total size of the next state linked list 410. Binary bit array 412 is organized in the same fashion as binary bit array 404, and therefore, further discussion is deemed unnecessary.

Output linked list 414 comprises members 414a–414n which represent all combinations of defined outputs for the SM which are related to the single one of the associated next state members 410a–410n that points to this output linked list 414. Members 414a–414n are arranged in a descending or ascending order within output linked list 414 that corresponds to the value assigned to the output represented by them. Each one of the members 414a–414n contains an output value corresponding to the output represented by them. Output linked list 414 also has a binary bit array 416 associated with it for indicating the total size of the output linked list 414. Binary bit array 416 is organized in the same fashion as binary bit array 404, and therefore, further discussion is deemed unnecessary.

It should be noted, however, that as the number of members increase for the current state linked list 402, the number of input linked lists 406 increases, and that as the number of input linked lists increase, the number of next state linked lists 410 also increases, and that as the number of next state linked lists 410 increase the number of output linked lists 414 also increases.

Figure 4:
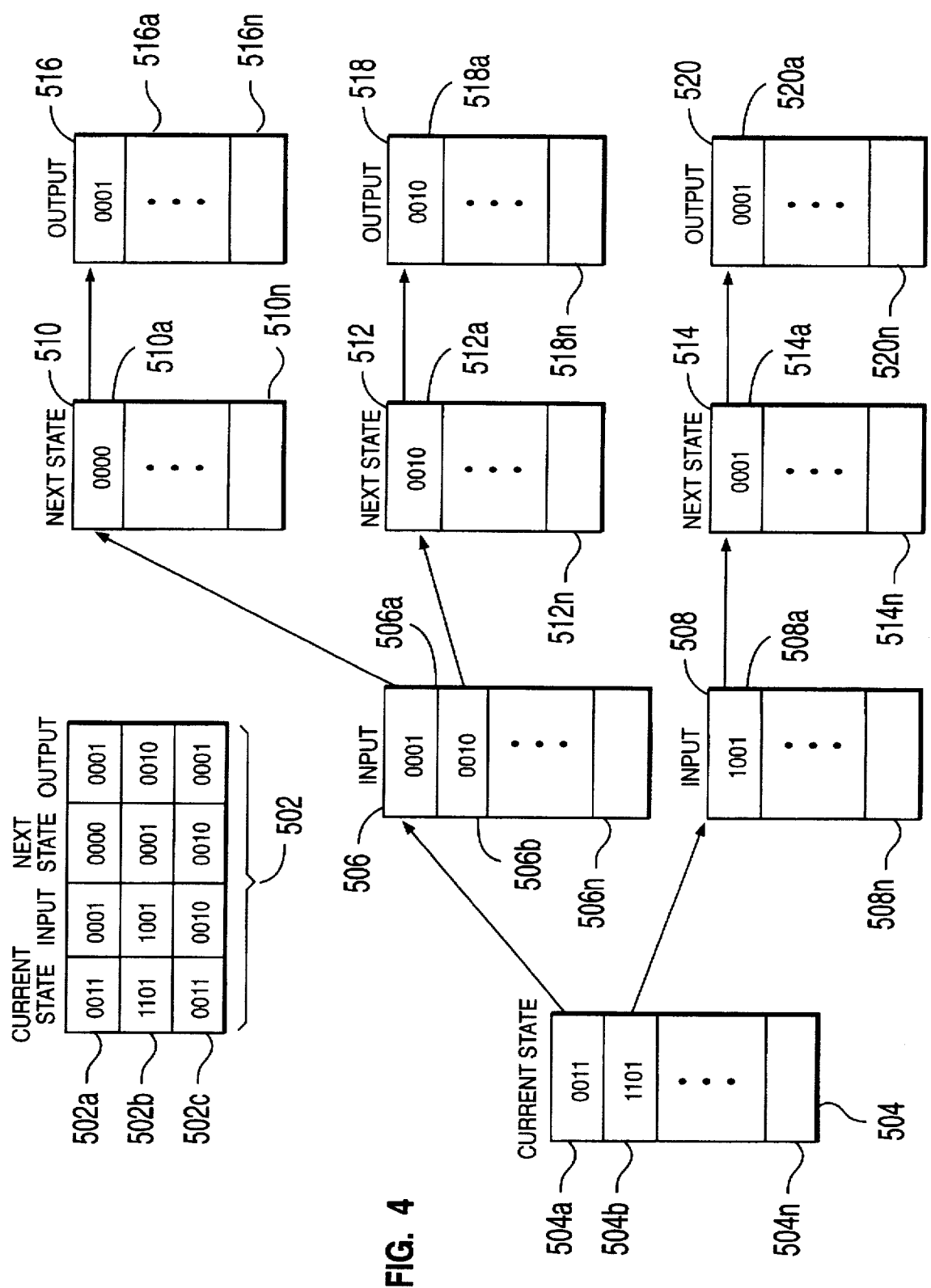
FIG. 4 is a block diagram illustrating an example of a binary representation of a microcode implementation for a state machine according to the teachings of the present invention.

Reference now being made to FIG. 4, a block diagram is shown illustrating an example of a binary representation of a microcode implementation for a state machine having three current states, inputs, next states, and outputs according to the teachings of the present invention. A table 502 represents all possible combinations for the current states, next states, inputs, and outputs of the state machine. The current states, inputs, next states, and outputs for the state machine are represented by four bit values. The combinations for the state machine have been designated as 502a–502c. In accordance with the teachings of the present invention, repetition of bit patterns for the combinations 502a–502c are recognized, and these bit patterns are organized into groups. The groups are represented by link lists and associated with one another so as to form the desired relationship of the combinations. In this example, it is recognized that the repetition of bit patterns occur in the current states. More specifically, bit pattern 0011.

Accordingly, a current state linked list 504 is created and indexed according to the values of the current states of the combinations 502a–502c. In this example, the members 504a–504b are assigned to represent the current state values so that the current state linked list 504 is sorted (indexed) in ascending order. Accordingly, current state linked list 504 designates members 504a and 504b to represent current state values 0011 and 1101, respectively. Each of the members 504a and 504b, however, contain a pointer to an individual input linked list 506 and 508, respectively. It should also be noted that although two combinations for 0011 exist for the state machine only one such value is maintained in the current state linked list 504.

Input linked list 506 comprises members 506a–506n which are to be used to represent the combinations of input values for current state member 504a. In this example, only values 0001 and 0010 exist. In this example, the members 506a–506b of input linking list 506 are assigned to represent the input values 0001 and 0010 so that the input linked list 506 is sorted (indexed) in ascending order. Accordingly, members 506a and 506b are assigned to represent the input values 0001 and 0010, respectively. Members 506a and 506b, however, contain pointers to next state linked lists 510 and 512, respectively.

Input linked list 508 comprises members 508a–508n which are used to represent the combinations of input values for current state member 504b. In this example, only input value 1001 exists. Accordingly, member 508a is assigned to represent input value 1001. Consequently, input linked list 508 is sorted (indexed) in ascending order. Member 508a, however, contains a pointer to next state linked list 514.

Next state linked list 510 comprises members 510a–510n which are used to represent the combinations of next state values for input state member 506a. In this example, only next state value 0000 exists. Accordingly, member 510a is assigned to represent next state value 0000. Consequently, next state linked list 508 is sorted (indexed) in ascending order. Member 510a, however, contains a pointer to output linked list 516.

Next state linked lists 512 and 514 comprise members 512a–512n and 514a–514n, respectively. Members 512a–512n and 514a–514n are used to represent the combinations of next state values for input state members 506b and 508a, respectively. In this example however, only next state values 0001 and 0010 exist for input state members 506b and 508a, respectively. Accordingly, members 512a and 514a are assigned to represent next state values 0001 and 0010, respectively. Consequently, next state linked lists 512 and 514 are sorted (indexed) in ascending order. Members 512a and 514a, however, each contain a pointer to output linked lists 518 and 520, respectively.

Output linked lists 516, 518 and 520 comprise members 516a–516n, 518a–518n, and 520a–520n, respectively. Members 516a–516n, 518a–518n, and 520a–520n are used to represent the combinations of output values for next state members 510a, 512a, and 514a, respectively. In this example, however, only output values 0001, 0010, and 0001 exist for next state members 510a, 512a, and 514a, respectively. Accordingly, members 516a, 518a, and 520a are assigned to represent next state values 0001, 0010, and 0001, respectively.

Consequently, output linked lists 516, 518, and 520 are sorted (indexed) in ascending order. Members 516a, 518a, and 520a each contain an output value.

It should also be clearly understood that each of the linked lists 504–520 has an individual bit array (not shown) associated with them as discussed in connection with FIG. 3. It should also be clearly understood that the members of linked lists current state 504, inputs 506 and 508, next states 510, 512, and 514, outputs 516, 518, and 520 as shown as containing the values of the states, inputs, or outputs represented. This is merely for clarification as to how these linked lists are indexed, and it should clearly be understood that the members of these linked lists actual contain pointers as indicated in the prior discussion.

Reference now being made to FIG. 5, a plurality of block diagrams 602–608 are shown for illustrating a plurality of alternative embodiments for the present invention. Block diagrams 602–608 are intended to illustrate possible groupings for repetitive bit patterns to be represented by corresponding linked lists. It should clearly be understood, however, that the groupings shown in FIG. 5 are in no way to be considered exhaustive, but merely a convenient method for further clarifying the numerous alternative embodiments to which the present invention is applicable. In example, the current states, the inputs and next states, and outputs, for a state machine could be represented in three linked lists, instead of four, and maintained as described previously described in connection with FIGS. 3–4. This relationship is illustrated by block diagram 602.

In yet another example, the current states and inputs, next states and outputs, for a state machine could be represented in two linked lists, instead of four, and maintained as previously described in connection with FIGS. 3–4. This relationship is illustrated by block diagram 604.

In yet another example, the current states could be split and represented by two content associative linked lists, the inputs could be split in two and represented by two content associative linked lists, and the next states and outputs could be combined and represented by a single linked list. These linked lists would be maintained in a similar manner as previously described in connection with FIGS. 3–4. This relationship is illustrated by block 606.

In a further example, the current states and inputs could be combined and represented in a single linked list, and the next states split and represented by two linked lists, and the outputs split and represented by two linked lists. These linked lists would be maintained in a similar manner as previously described in connection with FIGS. 3–4. This relationship is represented by block 608.

Figure 6:
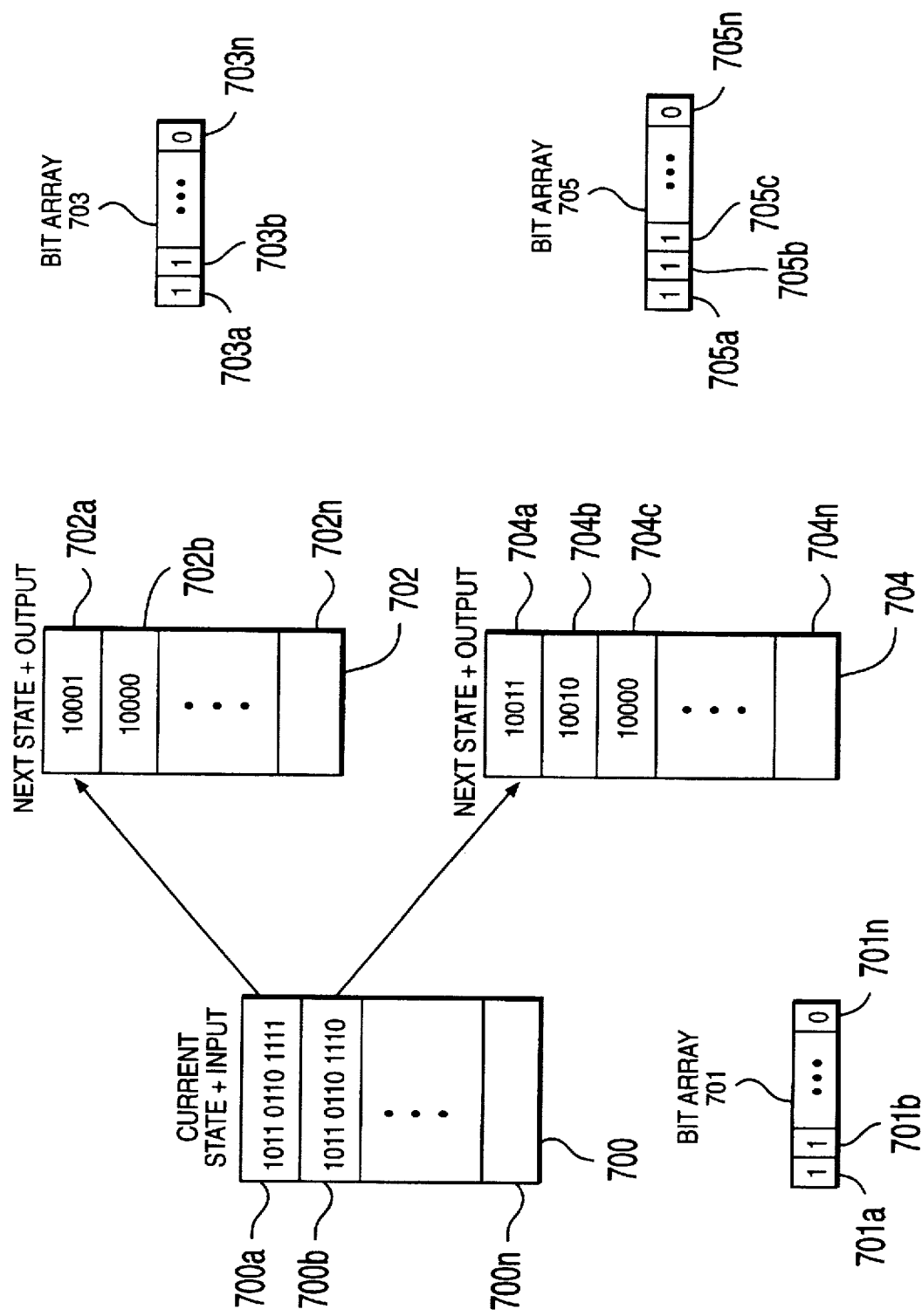
FIG. 6 is a block diagram illustrating an example for a microcode implementation of the state machine represented by the table of FIG. 2 according to the teachings of the present invention.

Reference now being made to FIG. 6, a block diagram is shown illustrating an example for a microcode implementation of the state machine represented by table 100 in FIG. 2 according to the teachings of the present invention. As stated above in connection with FIG. 4, the selection of how to organize the representation of the state machine using linked lists can be accomplished in many different ways.

In this example, by examining table 100 (FIG. 2) it is noticed that there is a repetition of binary digit patterns for all of the first four eight bits, and two repetition binary digit patterns for all of the next four bits. Based upon this, a grouping of these bit patterns for representation in linked lists can be selected.

In this example, the present state and input bit patterns are grouped together for representation by an individual linked list, and the next state and output bit patterns are grouped together for representation by an individual linked list. In accordance with the teachings of the present invention, a Current State and Input (CSI) linked list 700 is created and indexed according to the values of the combined bit patterns for current state and input values for the entries of 110–120 of table 100.

CSI linked list 700 comprises members 700a–700n. Members 700a and 700b have been designated to represent the combined bit patterns 101101101111 (for entries 110 and 112), and 101101101111 (for entries 116–120), respectively, for the present states and inputs of entries 116–120 (FIG. 2). It should also be noted that members 700a and 700b are designated to represent the bit patterns so that CSI linked list 700 is sorted in ascending order. Members 700a and 700b, however, contain a pointer to Next State and Output (NSO) linked lists 702 and 704, respectively. CSI linked list 700 also has a bit array 701 associated with it for indicating the usage of CSI linked list 700. Bit array 701 is organized in the same fashion as bit array 404 of FIG. 3. Accordingly, bits 701a and 701b are set to 1 to indicate the usage of corresponding CSI members 700a and 700b.

NSO linked list 702 comprises members 702a–702n. Members 702a and 702b have been designated to represent the combined bit patterns 10000 (entry 110), and 10001 (entry 112), respectively for the next states and outputs for entries 100 and 112 (FIG. 2). It should also be noted that members 702a and 702b are designated to represent the combined bit patterns so that NSO linked list 702 is sorted in ascending order. NSO linked list 702 also has a bit array 703 associated with it for indicating the usage of NSO linked list 702. Bit array 703 is organized in the same fashion as bit array 404 of FIG. 3. Accordingly, bits 703a and 703b are set to 1 to indicate the usage of corresponding NSO members 703a and 703b.

NSO linked list 704 comprises members 704a–704n. Members 704a, 704b, and 704c are designated to represent the combined bit patterns 10000 (entry 120), 10010 (entry 118), and 10011 (entry 116), respectively for combined bit patterns for next states and outputs of entries 116–120 (FIG. 2). It should also be noted that members 704a, 704b, and 704c are designated to represent the combined bit patterns so that NSO linked list 704 is sorted in ascending order. NSO linked list 704 also has a bit array 705 associated with it for indicating the usage of NSO linked list 704. Bit array 705 is organized in the same fashion as bit array 404 of FIG. 3. Accordingly, bits 705a, 705b, and 705c are set to 1 to indicate the usage of corresponding NSO members 704a, 704b, and 704c.

It should also be clearly understood that the members of linked lists current state and input linked list 700, next states and outputs 702 and 704, are shown as containing the values of the states inputs, or outputs represented. This is merely for clarification as to how these linked lists are indexed, and it should clearly be understood that the members of these linked lists actual contain pointers as indicated in the prior discussion.

It can readily be seen that a significant amount of memory and/or storage resources has been saved using the present invention. Assuming that each of the pointers used by the members of linked lists 700, 702, and 704 are four bits in length, the total number of bits required for representing the state machine is four times seven which equals 28 bits. This is in stark contrast to the 850 bits required by conventional storing.

It is thus believed that the operation and construction of the present invention will be apparent from the foregoing description. While the method and system shown and described has been characterized as being preferred, it will be readily apparent that various changes and/or modifications could be made therein without departing from the spirit and scope of the present invention as defined in the following claims.

What is claimed is:

1. In a data processing system, a method of implementing a state machine in microcode which is defined by a plurality of combinations each of which has a current state and a next state, the method comprising the steps of:

dividing each one of the combinations into an initial section, an intermediate section, and a final section, the initial section having at least two members with a common pattern;

storing, in the memory, an initial list having a plurality of members each of which represents at least one of the initial members, one of the initial list members representing the two common initial members;

storing, in the memory, for each one of the initial list members, an intermediate list having at least one member representing the intermediate section or sections for the corresponding initial list member;

storing, in the memory, for each one of the intermediate list members, a final list having at least one member representing the final section or sections for the corresponding intermediated list member;

storing, in each one of the initial list members, a pointer to a corresponding intermediated list;

storing, in each one of the intermediate list members, a pointer to a corresponding final list;

retrieving, for each one of the combinations, a single selected portion of the combination from each of the lists; and executing the retrieved portion.

2. The method of claim 1 wherein each one of said initial list members, each one of the intermediate list members, and each one of said final list members, have a value assigned to them, and said step of storing, in said memory, an initial list includes the step of:

indexing said initial list according to the values of said represented initial sections.

3. The method of claim 2 wherein said step of storing in said memory, for each of said initial members, an intermediate list includes the step of:

indexing said intermediate list according to the value of said represented intermediate section.

4. The method of claim 3 wherein said step of storing in said memory, for each one of the intermediate list members, a final list includes the step of:

indexing said final list according to the value represented by said final section.

5. A computer program product for use in a data processing system having memory, the computer program product comprising:

a computer usable medium having computer readable program code means embodied in the medium for implementing a state machine in microcode which is define by a plurality of combinations each of which has a current state and a next state, the computer readable program code means including:

means for dividing each one of the combinations into an initial section, an intermediate section, and a final section, the initial section having at least two members with a common pattern;

means for storing, in the memory, an initial list having a plurality of members each of which represents at least one of the initial members, one of the initial list members representing the two common initial members;

means for storing, in the memory, for each one of the initial list members, an intermediate list having at least one member representing the intermediate section or sections for the corresponding initial list member;

means for storing, in the memory, for each one of the intermediate list members, a final list having at least one member representing the final section or sections for the corresponding intermediated list member;

means for storing, in each one of the initial list members, a pointer to a corresponding intermediated list;

means for storing, in each one of the intermediate list members, a pointer to a corresponding final list means for retrieving, for each one of the combinations, a single selected portion of the combination from each of the lists; and means for executing the retrieved portion.

6. The computer program product of claim 5 wherein each one of said initial list members, each one of said intermediate list members, and each one of said final list members, have a value assigned to them, and said computer readable program code means for storing, in said memory, an initial list includes:

means for indexing said initial list according to the values of said represented initial sections.

7. The computer program product of claim 6 wherein said computer readable program code means for storing in said memory, for each of said initial list members, an intermediate list includes:

means for indexing said intermediate list according to the value of said represented intermediate section.

8. The computer program product claim 7 wherein said computer readable program code means for storing in said memory, for each intermediate member, a final list includes:

means for indexing said final list according to the value represented by said final section.

* * * * *

UNITED STATES PATENT AND TRADEMARK OFFICE
CERTIFICATE OF CORRECTION

PATENT NO. : 5,765,026
DATED : June 9, 1998
INVENTOR(S) : Zhongru J. Lin, Nadeem Malik, Chandrasekhar Narayanaswami
Avijit Saha and Brett A. St. Onge It is certified that error appears in the above-identified patent and that said Letters Patent is hereby corrected as shown below:

Col. 7, line 19, delete "101101101111" and insert --101101101110--.

Signed and Sealed this

Twenty-ninth Day of June, 1999

Attest:

Q. TODD DICKINSON

*Attesting Officer*   *Acting Commissioner of Patents and Trademarks*